(12) United States Patent
Flick

(10) Patent No.: US 6,771,167 B1
(45) Date of Patent: Aug. 3, 2004

(54) VEHICLE ALERT SYSTEM FOR VEHICLE HAVING A DATA BUS AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

(21) Appl. No.: 09/490,192

(22) Filed: Jan. 24, 2000

Related U.S. Application Data

(63) Continuation-in-part of application No. 09/382,245, filed on Aug. 25, 1999, now Pat. No. 6,275,147, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.[7] ............................................. B60R 25/10
(52) U.S. Cl. .................. 340/426; 340/531; 340/539.11; 307/10.2
(58) Field of Search ............................. 340/426, 425.5, 340/825.69, 438, 825.37, 539.11, 531; 701/2; 307/10.2, 10.3, 10.4, 10.5

(56) References Cited

U.S. PATENT DOCUMENTS

| | | | |
|---|---|---|---|
| 4,055,772 A | 10/1977 | Leung | 307/10 R |
| 4,236,594 A | 12/1980 | Ramsperger | 180/167 |
| 4,288,778 A | 9/1981 | Zucker | 340/64 |
| 4,446,460 A | 5/1984 | Tholl et al. | 340/825.69 |
| 4,538,262 A | 8/1985 | Sinniger et al. | 370/85 |
| 4,697,092 A | 9/1987 | Roggendorf et al. | 307/10 R |
| 4,754,255 A | 6/1988 | Sanders et al. | 340/64 |
| 4,760,275 A | 7/1988 | Sato et al. | 307/10 R |
| 4,761,645 A | 8/1988 | Mochida | 340/825.31 |
| 4,792,783 A | 12/1988 | Burgess et al. | 340/22 |

(List continued on next page.)

FOREIGN PATENT DOCUMENTS

| | | | |
|---|---|---|---|
| DE | 195 30 721 A1 | 2/1997 | H02J/9/04 |
| EP | 0 699 562 A2 | 7/1995 | B60R/16/02 |
| WO | WO 97/28988 | 8/1997 | B60R/16/02 |

OTHER PUBLICATIONS

Society of Automotive Engineers, Inc., "Surface Vehicle Information Report," SAE J2058 (Jun. 21, 1990).

(List continued on next page.)

*Primary Examiner*—Toan N. Pham
(74) *Attorney, Agent, or Firm*—Allen, Dyer, Doppelt, Milbrath & Gilchrist, P.A.

(57) ABSTRACT

A vehicle alerting system includes at least one security device at the vehicle for generating security signals on the data communications bus, a remote receiver to be carried by a user, a local transmitter at the vehicle, and a paging controller at the vehicle. The paging controller is connected to the local transmitter and data communications bus. The paging controller is for causing the local transmitter to transmit to the remote receiver based upon security signals on the data communications bus to thereby alert the user when away from the vehicle. The system may further include an indicator connected to the remote receiver for providing an indication to the user relating to security of the vehicle. The at least one security device may comprise at least one of a door switch, trunk switch, hood switch, motion sensor, and proximity sensor. The at least one security device may also or alternately comprise a security controller. The paging controller may include a desired signal enabling feature for causing the local transmitter to transmit to the remote receiver based upon predetermined security signals for a corresponding desired vehicle from a plurality of sets of security signals for different vehicles.

43 Claims, 5 Drawing Sheets

U.S. PATENT DOCUMENTS

| | | | | |
|---|---|---|---|---|
| 4,794,368 A | * | 12/1988 | Grossheim et al. | 340/426 |
| 4,841,159 A | | 6/1989 | Evans et al. | 307/38 |
| 4,897,630 A | * | 1/1990 | Nykerk | 340/426 |
| 4,926,332 A | | 5/1990 | Komuro et al. | 364/424.05 |
| 4,940,964 A | * | 7/1990 | Dao | 340/438 |
| 5,006,843 A | | 4/1991 | Hauer | 340/825.31 |
| 5,024,186 A | | 6/1991 | Long et al. | 123/179 B |
| 5,040,990 A | | 8/1991 | Suman et al. | 439/34 |
| 5,046,041 A | | 9/1991 | Lecocq et al. | 364/900 |
| 5,049,867 A | | 9/1991 | Stouffer | 340/426 |
| 5,054,569 A | | 10/1991 | Scott et al. | 180/167 |
| 5,081,667 A | | 1/1992 | Drori et al. | 379/59 |
| 5,142,278 A | | 8/1992 | Moallemi et al. | 340/825.06 |
| 5,146,215 A | | 9/1992 | Drori | 340/825.32 |
| 5,243,322 A | | 9/1993 | Thompson et al. | 340/429 |
| 5,252,966 A | | 10/1993 | Lambropoulos et al. | 340/825.69 |
| 5,315,285 A | * | 5/1994 | Nykerk | 340/426 |
| 5,406,270 A | | 4/1995 | Van Lente | 340/825.34 |
| 5,473,540 A | | 12/1995 | Schmitz | 701/1 |
| 5,475,818 A | | 12/1995 | Molyneaux et al. | 395/200.05 |
| 5,506,562 A | | 4/1996 | Wiesner | 340/425.5 |
| 5,521,588 A | | 5/1996 | Kuhner et al. | |
| 5,523,948 A | | 6/1996 | Adrain | |
| 5,555,498 A | | 9/1996 | Berra et al. | 364/424.03 |
| 5,559,491 A | * | 9/1996 | Stadler | 340/426 |
| 5,606,306 A | | 2/1997 | Mutoh et al. | 340/426 |
| 5,612,578 A | | 3/1997 | Drew | 307/10.5 |
| 5,619,412 A | | 4/1997 | Hapka | 364/424.045 |
| 5,646,457 A | | 7/1997 | Vakavtchiev | 307/10.6 |
| 5,673,017 A | | 9/1997 | Dery et al. | 340/426 |
| 5,689,142 A | | 11/1997 | Liu | 307/10.5 |
| 5,719,551 A | | 2/1998 | Flick | 340/426 |
| 5,721,550 A | | 2/1998 | Lopez | 341/176 |
| 5,739,748 A | * | 4/1998 | Flick | 340/426 |
| 5,757,086 A | | 5/1998 | Nagashima | 307/10.6 |
| 5,793,283 A | * | 8/1998 | Davis | 340/426 |
| 5,811,886 A | * | 9/1998 | Majmudar | 307/10.2 |
| 5,818,330 A | | 10/1998 | Schweiger | 340/426 |
| 5,832,397 A | | 11/1998 | Yoshida et al. | 701/29 |
| 5,838,255 A | | 11/1998 | Di Croce | 340/825.69 |
| 5,912,512 A | | 6/1999 | Hayashi et al. | 307/10.5 |

OTHER PUBLICATIONS

Society of Automotive Engineers, Inc., "Surface Vehicle Standard," SAE J1850 (Rev'd 7/95).

Mark Thompson, "The Thick and Thin of Car Cabling," *IEEE Spectrum*, pp. 42–45 (2/96).

SAE International, *In–Vehicle Electronics for IVHS Workshop, Speaker Handouts*, Nov. 30 and Dec. 1, 1995.

SAE International, *In–Vehicle Electronics for Intelligent Transportation Systems, Workshop II Results*, Jul. 9–10, 1996.

SAE International, Wolfgang Voss and Karlheinz Butscher, *In–Vehicle Data Bus Systems—the Key for New Concepts In Comfort and Convenience Electronics*, Feb. 26–29, 1996, pp. 1–9.

SAE International, Chuck Powers and Randy Frank, *The Consumerization of the Automotive Environment: The ITS Data Bus*, Aug. 6–8, 1997, pp. 1–7.

* cited by examiner

VEHICLE ALERT SYSTEM FOR VEHICLE HAVING A DATA BUS AND ASSOCIATED METHODS

RELATED APPLICATIONS

The present application is a continuation-in-part of U.S. patent application Ser. No. 09/382,245 filed Aug. 25, 1999 now U.S. Pat. No. 6,275,147, which, in turn, is a continuation of application Ser. No. 09/023,838, filed Feb. 13, 1998, now U.S. Pat. No. 6,011,460, which in turn, is a continuation-in-part of application Ser. No. 08/701,356, filed Aug. 22, 1996, now U.S. Pat. No. 5,719,551, the disclosures of all being incorporated herein by reference.

FIELD OF THE INVENTION

The invention relates to the field of vehicle-related electronics, and, more particularly to vehicle alert systems and related methods for alerting a user when away from the vehicle.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry (RKE) system for a vehicle. The RKE system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to seduce cables to three or four wires and to simplify the exchange of data among the various onboard electronic systems as disclosed, for example, in "The Thick and Thin of Car Cabling" by Thompson appearing in the IEEE Spectrum, February 1996, pp. 42–45.

Implementing multiplexing concepts in vehicles in a cost-effective and reliable manner may not be easy. Successful implementation, for example, may require the a development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle security systems for hardwired connection to vehicle devices, such as aftermarket vehicle security systems, are not readily adaptable to a vehicle including a data communications bus. Moreover, a vehicle security system if adapted for a communications bus and devices for one particular model, model year, and manufacturer, may not be compatible with any other models, model years, or manufacturers. Other systems for remote control of vehicle functions may also suffer from such shortcomings.

Yet another shortcoming of vehicle security systems to the extent they may be compatible with a vehicle having a data communications bus, is that such systems provide only a local indication of an alarm trigger, for example. Accordingly, should the user be unable to hear the alarm indication at the vehicle, such as when the user is in an adjacent building, the user is not alerted to the alarm and can take no preventive action.

SUMMARY OF THE INVENTION

In view of the foregoing background, it is therefore an object of the present invention to provide a system and method for alerting a user when away from the vehicle regarding vehicle security or other vehicle-related information when the vehicle includes a data communications bus.

This and other objects, features and advantages in accordance with the present invention are provided by a vehicle alerting system comprising at least one device at the vehicle, such as for generating security signals on the data communications bus, a remote receiver to be carried by a user, a local transmitter at the vehicle, and a paging controller at the vehicle. The paging controller is connected to the local transmitter and data communications bus. The paging controller is for causing the local transmitter to transmit to the remote receiver based upon security signals on the data communications bus to thereby alert the user when away from the vehicle.

The system may further include an indicator connected to the remote receiver for providing an indication to the user relating to security of the vehicle. For example, the indicator may comprise at least one of an audible, visual, or tactile indicator.

The at least one security device may comprise at least one of a door switch, trunk switch, hood switch, motion sensor, and proximity sensor. Alternately or in addition, the at least one security device may comprise a security controller. For the security controller, the security signals generated may be at least one of an alarm signal and a security controller status signal. For example, the security signals could relate to triggering of the alarm, or changing the status of the security controller from an armed to disarmed mode or vice-versa.

The system may also include a remote transmitter to be carried by the user, and a local receiver at the vehicle connected to the security controller for receiving signals from the remote transmitter. In a variation, a common housing may contain both the remote transmitter and the remote receiver.

In some embodiments, the transmission from the local transmitter to the remote receiver may be a direct path. In other embodiments, at least one additional communications link may be provided for relaying signals from the local transmitter to the remote receiver.

Another optional aspect of the invention relates to adaptability to a variety of vehicles, or, more particularly, to different signal sets for different vehicle makes or models. In other words, the paging controller may include desired signal enabling means for causing the local transmitter to transmit to the remote receiver based upon predetermined signals for a corresponding desired vehicle from a plurality of sets of signals for different vehicles. The desired signal enabling means may comprise a memory for storing a plurality of sets of signals for different vehicles, and a selector for selecting predetermined signals from the plurality of different sets of signals for different vehicles. The selector may include a user selector for permitting a user to select the predetermined signals. In other embodiments, the desired signal enabling means may comprise bus learning means for learning the predetermined signals based upon signals on the data communications bus. The desired signal enabling means may also comprise download learning means for learning the predetermined signals from a downloading device.

A method aspect of the invention is for alerting a user when away from a vehicle. The vehicle is preferably of a type comprising a data communications bus, and at least one device at the vehicle for generating signals on the data communications bus. The method preferably comprises the steps of providing a remote receiver to be carried by the user, and installing a paging unit in the vehicle. The paging unit preferably includes a local transmitter and a paging controller connected thereto for causing the local transmitter to transmit to the remote receiver based upon signals on the data communications bus.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime notation is used to indicate similar elements in alternate embodiments.

Figure 1:
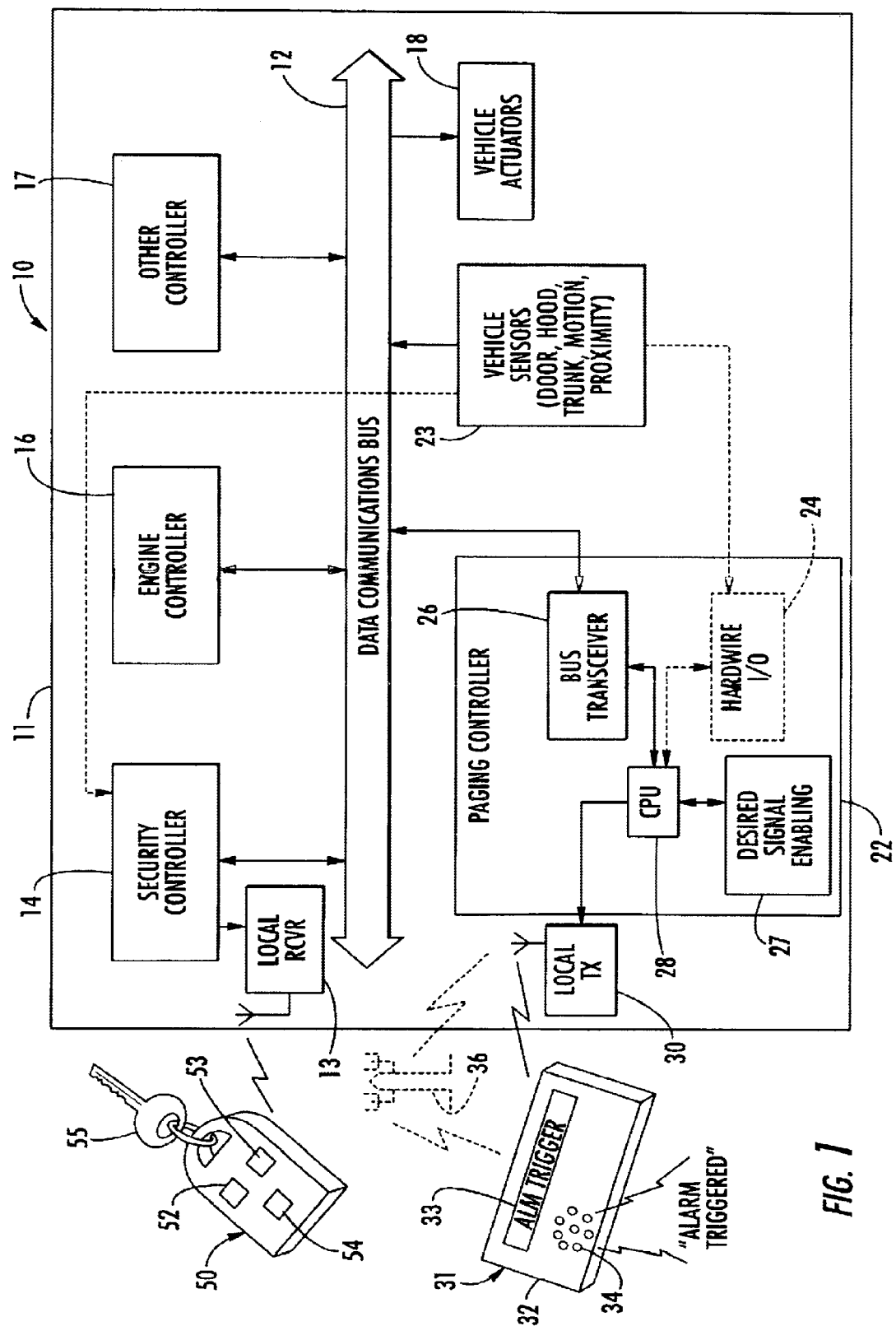
FIG. 1 is a schematic block diagram of a vehicle alerting system in accordance with the present invention.

Referring now initially to FIG. 1, a first embodiment of a vehicle alerting system 10 is now described. The system 10 includes a data communications bus 12 connected to a number of vehicle devices. In particular, as shown in the illustrated embodiment, a security controller 14 is connected to the bus, along with an engine controller 16, and one or more other controllers 17. The controllers exchange data between one another and/or with other devices connected to the bus 12 and in the vehicle 11 as will be readily appreciated by those skilled in the art. Those of skill in the art will also recognize that not all of the illustrated controllers, or different controllers may also be connected to the data communications bus 12. One or more vehicle actuators 18 are also connected to the data communications bus 12.

The security controller 14 is also illustratively connected to a local receiver 13 for receiving signals from a remote transmitter unit 50. The remote transmitter unit 50 is carried by a user. The remote transmitter unit 50 includes a housing 51 which carries a number of user depressable buttons or switches thereon. For example, the housing 51 may carry a door lock button 52, a door unlock button 53, and trunk release button 54. On the reverse side, a panic button may be provided to permit the user to sound the horn at the vehicle as will be appreciated by those skilled in the art. In addition, the housing 51 is illustratively coupled to a vehicle key 55 as will also be appreciated by those skilled in the art.

The remote transmitter unit 50 could additionally or alternately include switches for switching between armed and disarmed modes. In the armed mode, the security controller 14 could generate an alarm indication at the vehicle, for example, by sounding a siren or the vehicle horn responsive to the triggering of a security sensor.

In one embodiment, the local receiver 13 is of the changing code type as will be readily appreciated by those skilled in the art. By changing code is meant that the remote transmitter unit 50 sends a signal including a series of bits modulated on a radio frequency carrier, for example. These bits would typically include fixed code portions as well as changing code portions. The changing code portion provides additional security so that unauthorized transmitters cannot be used to activate the security controller 14. In particular, the term changing code is meant to cover fairly short repeating codes, such as are generally described as rolling codes. Such rolling codes may repeat as often as every eight transmissions, for example. In addition, changing code is also intended to cover pseudorandom codes that may only repeat after many thousands or even millions of operations as will be understood by those skilled in the art. The remote transmitter unit 50 and local receiver 13 are synchronized together with each having the changing code pattern stored therein or generated internally as will be readily understood by those skilled in the art.

The security controller 14 may communicate with one or more vehicle sensors 23, such as door pin switches, a hood switch, trunk switch, a motion sensor, and/or a proximity sensor. Such sensors are conventional for security systems and need no further discussion herein. In the illustrated embodiment, these sensors 23 are shown connected to the data communications bus 12, and, hence, the sensors may include individual bus interface or transceiver circuits, or several sensors may share a common bus interface, as will be appreciated by those skilled in the art. As will also be appreciated by those skilled in the art, one or more of such sensors 23 may be directly connected to the security controller 14 as indicated by the dashed line extending therebetween.

The vehicle system 10 also includes a paging unit which comprises a paging controller 22 and a local transmitter 30. The paging controller 22 is connected to the data communications bus 12 via the bus transceiver 26. The paging controller 22 also includes a central processing unit (CPU) 28 which controls and/or performs the various operational functions described herein. The paging controller 22 may also include an optional hardwire I/O circuit 24 to interface directly to one or more vehicle sensors or other devices as will be appreciated by those skilled in the art. The paging controller 22 is for causing the local transmitter 30 to transmit to the remote receiver carried by the illustrated paging device 31 based upon security signals on the data communications bus 12 to thereby alert the user when away from the vehicle. Accordingly, the user could be timely alerted that his vehicle was being broken into, and could promptly notify the appropriate authorities.

As shown, the paging device 31 may include a small portable housing 32 to be carried by the user. The housing 32, in turn, carries electronic circuitry including the remote receiver. One or more indicators may be connected to the remote receiver for providing an indication to the user relating to security of the vehicle. For example, the indicator may comprise visual indicator, such as an LCD display 32 for alphanumeric messages. The indicator may be provided by a speaker 34 or other audible transducer for providing an alert tone, or a speech message ("alarm triggered") to the user. Of course, the indicator may provide tactile stimulation to the user, such as by vibrating as will also be appreciated by those skilled in the art.

Although the paging unit 31 is illustratively in the compact rectangular form of a conventional pager, it may take other forms. For example, the remote receiver could be built into a cellular telephone or other similar personal communications device carried by a user.

In one class of embodiments, the at least one security device which communicates with the paging controller 22 via the data communications bus 12, is the one or more vehicle sensors 23. In another class of embodiments, the at least one security device which generates the security signals on the data communications bus 12 is the security controller 14. For the security controller 14, the security signals generated may be at least one of an alarm signal and a security controller status signal. For example, the security signals could relate to changing of the security controller 14 from an armed to disarmed mode or vice-versa. Those of skill in the art will appreciate other security-related signals that can be read by the paging controller 22 to determine whether and what message to communicate to the user via the remote receiver and other portions of the paging device 31.

As will be appreciated by those skilled in the art, the local transmitter 30 may communicate with the remote receiver via one or more intervening communications links or paths. As schematically illustrated by the dashed cellular tower 36 the relay function may be provided by one or more cellular telephone links. The relay link may be provided by other types of radio links, such as satellite, and may also include one or more landline portions as will be appreciated by those skilled in the art. However, since the user may typically be relatively near the vehicle, such as at work or home, for many situations a direct radio link from the local transmitter 30 to the remote receiver will be adequate.

Figure 2:
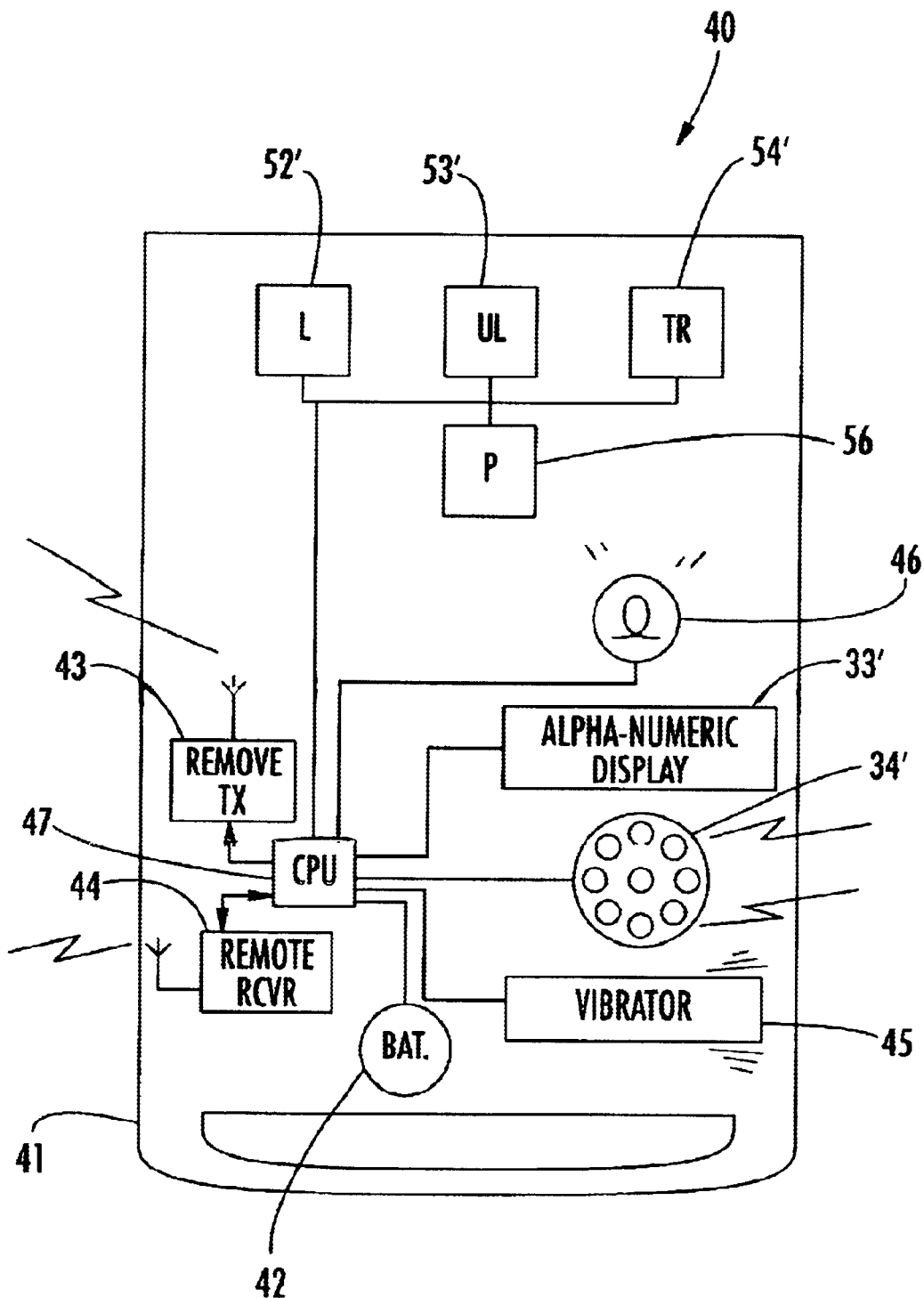
FIG. 2 is a schematic block diagram of a unit to be carried by the user and including the remote transmitter and remote receiver as may be used in the system of FIG. 1.

Turning now additionally to FIG. 2, a variation of the invention wherein the remote transmitter 43 and remote receiver 44 are included in a common housing 41 of a combination unit 40 is now described. The combination unit 40 also includes a battery 42 for powering the various circuits and devices. A vibrator 45 is provided for giving a tactile indication to the user. A central processing unit (CPU) 47 performs or controls the various functions of the unit. A panic switch or button 56 is also carried by the housing 41 for initiating a panic alarm at the vehicle 11. An indicator light 46 is also carried by the housing 41 in the illustrated embodiment. Those other elements similar to ones discussed above are indicated with prime notation and need no further discussion herein.

Figure 3:
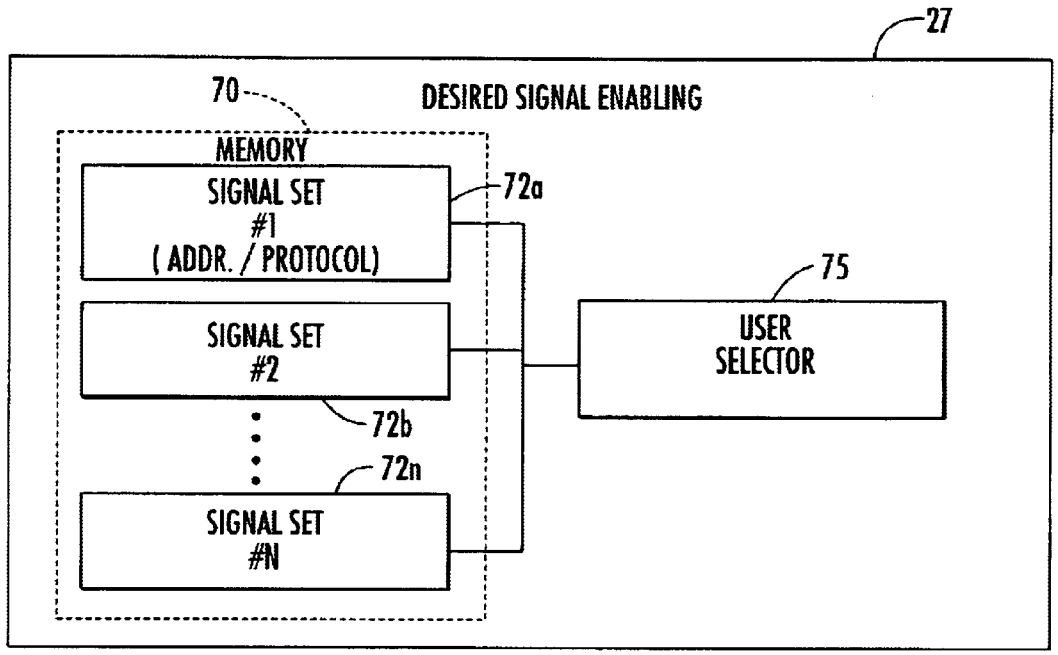
FIG. 3 is a first embodiment of the desired signal enabling portion of the pager controller in accordance with the invention.

Turning now additionally to FIG. 3 a first embodiment of the desired signal enabling means 27 is described. The desired signal enabling means 27 permits the paging controller 22 to operate using a desired set of signals for a desired vehicle from among a plurality of possible sets of signals for different vehicles. As would be readily understood by those skilled in the art, the term different vehicles may include vehicles from different or the same manufacturers, different models, or even different trim levels of the same make and model. Accordingly, the desired signal enabling means 27 permits the paging controller 22, to communicate with the vehicle security sensor 23 and/or the security controller 14 via the data communications bus 12.

In the illustrated embodiment of FIG. 3, the desired signal enabling means 27 may preferably include a memory 70 for storing a plurality of sets 72*a*, 72*b* and 72*n* of signals for different vehicles, and selecting means for selecting the desired set of signals from the plurality of different sets of signals for different vehicles. By storing sets of signals is meant storing information or data necessary to read the desired signals on the data bus 12 as would be readily understood by those skilled in the art. The memory 70 may include a device address memory for storing a plurality of different sets of signals representative of different device addresses for different vehicles. Alternatively, or in addition thereto, the memory may comprise a protocol memory for storing a plurality of different protocols for different vehicles.

The selecting means may comprise a user selector 75 for permitting a user to select the desired set of signals. A keypad or other input device may be used to permit the user to select the desired signal set for his vehicle. A valet switch, for example, may also be operated by the user to select the desired signal set. The user may select the desired set of signals by entering a unique digital code similar to the selection of signals for a home electronics universal remote control. Other techniques for permitting the user to select the desired signal set from a plurality of stored sets are also contemplated by the invention as could be readily appreciated by those skilled in the art.

Figure 4:
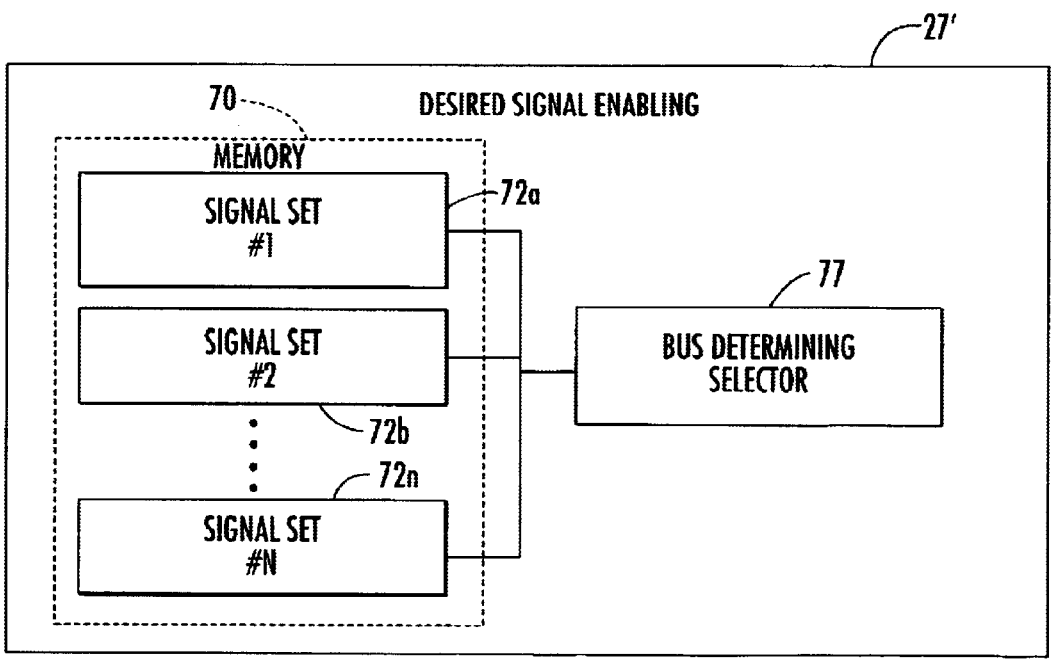
FIG. 4 is a second embodiment of the desired signal enabling portion of the pager controller in accordance with the invention.

Referring now additionally to FIG. 4 another embodiment of the desired signal enabling means 27' is described in accordance with the present invention. In this embodiment, the selecting means may comprise a bus determining selector 77 for determining the desired set of signals based upon signals on the data communications bus. For example, the bus determining selector could determine the desired set of signals based upon sensed voltage levels or based upon the timing of signal pulses on the data communications bus 12. The other components of this embodiment of the desired signal enabling means 27' are similar to those described above with reference to FIG. 3 and need no further description.

Figure 5:
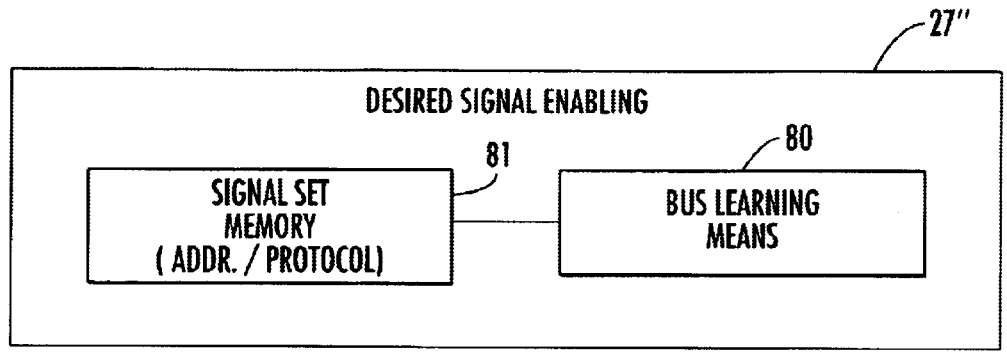
FIG. 5 is a third embodiment of the desired signal enabling portion of the pager controller in accordance with the invention.

In yet another embodiment of the desired signal enabling means 27" as shown in FIG. 5, the desired signal enabling means comprises a desired signal set memory 81 operatively connected to the illustrated bus learning circuit or means 80. The bus learning circuit or means 80 may determine and store in the signal set memory 81 the protocol and/or device addresses for the vehicle devices. For example, the bus learning circuit or means 80 may permit the user to operate various vehicle devices and store a desired signal set based thereon as would be readily understood by those skilled in the art. The other components of the desired signal enabling means 27" are similar to those described above with reference to FIG. 3 and need no further description.

Figure 6:
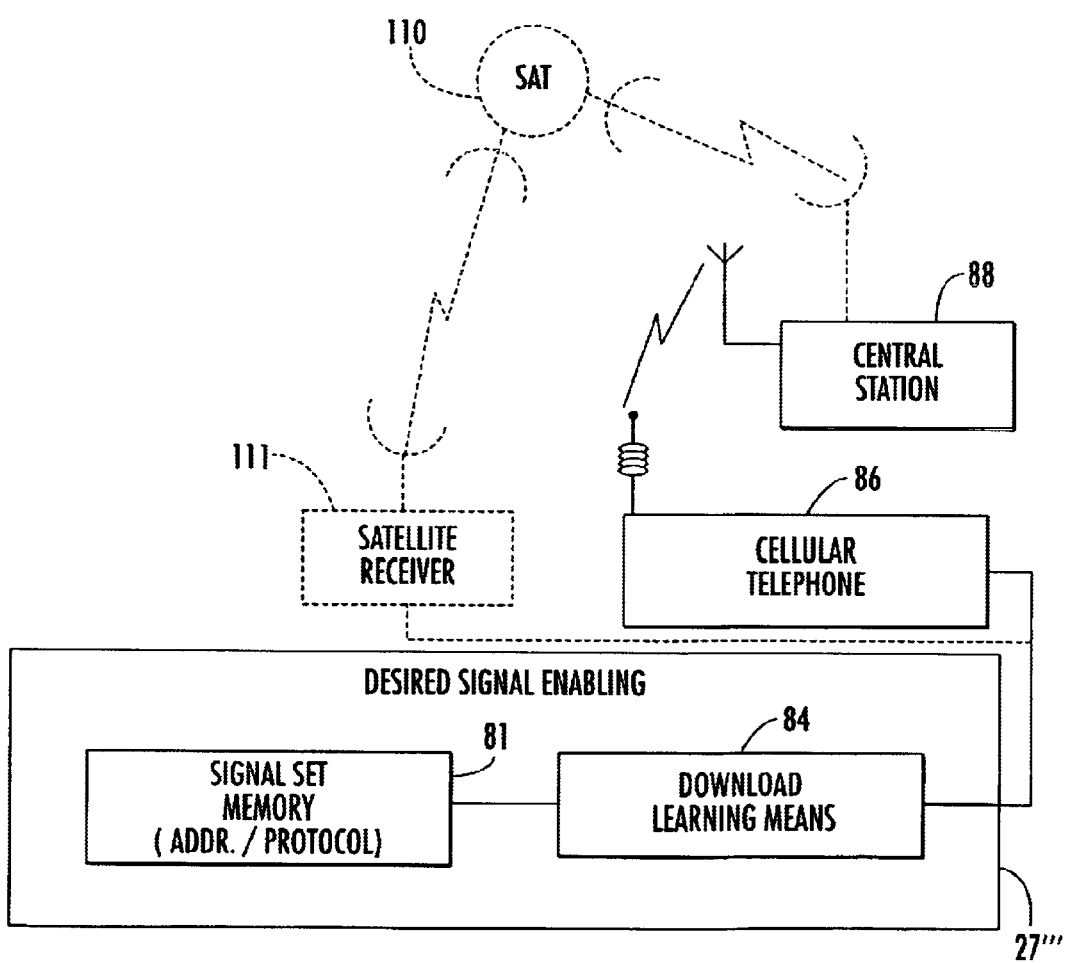
FIG. 6 is a fourth embodiment of the desired signal enabling portion of the pager controller in accordance with the invention.

Still another embodiment of the desired signal enabling means 27''' is explained with reference to FIG. 6. The desired signal enabling means 27''' includes a signal set memory 81 operatively connected to the schematically illustrated download learning means 84. The download learning means 84 may include an interface connected to the illustrated vehicle cellular telephone 86 to permit learning or downloading of the desired signal set from a remote or central monitoring and control station 88, for example. The desired signal set may also alternately be learned from the central station 88 through the satellite link provided by the satellite 110 and vehicle mounted satellite receiver 111 and associated antennas. As would be readily understood by those skilled in the art, the download learning means, as well as the other desired signal enabling leans may be implemented by software in the CPU 28 of the paging controller 22 or in a separate microprocessor or circuits.

Figure 7:
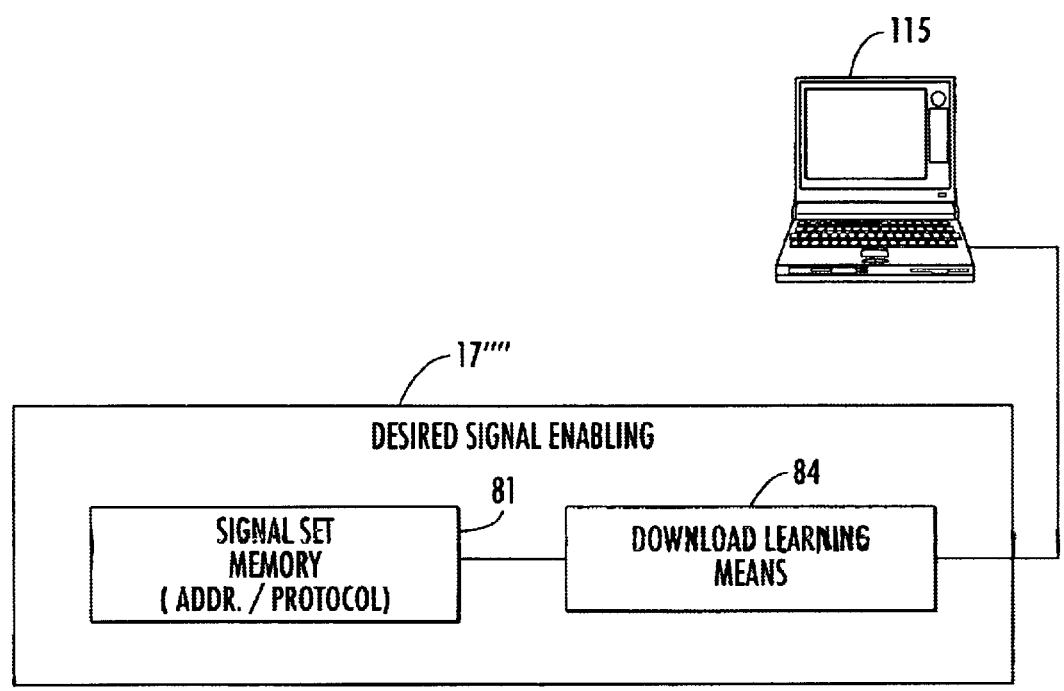
FIG. 7 is a fifth embodiment of the desired signal enabling portion of the pager controller in accordance with the invention.

Turning now additionally to FIG. 7, another variation of programming, learning or downloading of the download learning means 84 is explained. In this variation the download learning means 84 is temporarily connected to a computer, such as the illustrated portable laptop computer 115. The connection, may be via a wire cable or wireless communications link as will be readily understood by those skilled in the art. Of course, the desired signal enabling means 17"" in this embodiment may be programmed in the vehicle or prior to installation in the vehicle. The laptop computer 115 may receive the desired signal set from an Internet website, for example, as will be readily appreciated by those skilled in the art.

Returning again to FIGS. 1 and 2, a method aspect of the invention is for alerting a user when away from a vehicle. The vehicle 11 preferably is of a type comprising a data communications bus 12, and at least one device at the vehicle for generating signals on the data communications bus. The method preferably comprises the steps of: providing a remote receiver 43 to be carried by the user; and installing a paging unit in the vehicle and comprising a local transmitter 30 and a paging controller 22 connected thereto for causing the local transmitter to transmit to the remote receiver based upon signals on the data communications bus. The at least one device may preferably be for generating security signals on the data communications bus. For example, the at least one security device may comprise one or more senors 23 and/or a security controller 14 as described above.

The paging unit and features described herein may have applications other than the broad category of vehicle security. For example, the invention may also be applicable to maintenance or diagnostic activities, and may be responsive to signals generated on the data communications bus 12 by the engine controller 16 or other controller 17 as will be readily understood by those skilled in the art. The paging unit may also give an indication to the user that the vehicle engine has been started when the vehicle is equipped with a remote start controller that periodically starts the engine. Of course, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle alerting system for a vehicle comprising a data communications bus extending within the vehicle, at least one security device for generating security signals on the data communications bum, and at least one non-security device also communicating over the data communications bus, the vehicle alerting system comprising:
- a remote receiver to be carried by a user;
- a local transmitter to be positioned at the vehicle; and
- a paging controller to be connected to the data communications bus extending within the vehicle for causing said local transmitter to transmit to said remote receiver based upon security signals on the data communications bus to thereby alert the user when away from the vehicle.

2. A vehicle alerting system according to claim 1 further comprising an indicator connected to said remote receiver for providing an indication to the user relating to security of the vehicle.

3. A vehicle security system according to claim 2 wherein said indicator comprises at least one of an audible, visual, and tactile indicator.

4. A vehicle alerting system according to claim 2 wherein the at least one security device comprises at least one of a door switch, trunk switch, hood switch, motion sensor, and proximity sensor.

5. A vehicle alerting system according to claim 1 wherein the at least one security device comprises a security controllers and wherein the security signals generated by the security controller comprise at least one of an alarm signal and a security controller status signal.

6. A vehicle alerting system according to claim 5 further comprising:
- a remote transmitter to be carried by the user; and
- a local receiver at the vehicle connected to the security controller for receiving signals from said remote transmitter.

7. A vehicle alerting system according to claim 6 further comprising a housing containing said remote transmitter and said remote receiver.

8. A vehicle alerting system according to claim 1 further comprising at least one additional communications link for relaying signals from said local transmitter to said remote receiver.

9. A vehicle alerting system according to claim 1 wherein said paging controller comprises desired signal enabling means for causing said local transmitter to transmit to said remote receiver based upon predetermined security signals for a corresponding desired vehicle from a plurality of sets of security signals for different vehicles.

10. A vehicle alerting system according to claim 9, wherein said desired signal enabling means comprises:
- a memory for storing a plurality of sets of security signals for different vehicles; and
- a selector for selecting predetermined security signals from the plurality of different sets of security signals for different vehicles.

11. A vehicle alerting system according to claim 10 wherein said selector comprises a user selector for permitting a user to select the predetermined security signals.

12. A vehicle alerting system according to claim 9 wherein said desired signal enabling means comprises bus learning means for learning the predetermined security signals based upon security signals on the data communications bus.

13. A vehicle alerting system according to claim 9 wherein said desired signal enabling means comprises download learning means for learning the predetermined RKE signals from a downloading device.

14. A vehicle alerting system according to claim 1 wherein the at least one non-security device comprises a non-security controller.

15. A vehicle alerting system according to claim 14 wherein the non-security controller comprises an engine controller.

16. A vehicle alerting system according to claim 1 wherein the at least one non-security device comprises a vehicle actuator.

17. A vehicle alerting system for a vehicle comprising a data communications bus extending within the vehicle, at least one security sensor for generating security signals on the data communications bus, and at least one non-security device also communicating over the data communications bus, the vehicle alerting system comprising:
- a remote receiver to be carried by a user;
- a local transmitter to be positioned at the vehicle; and
- a paging controller to be connected to the data communications bus extending within the vehicle for causing said local transmitter to transmit to said remote receiver based upon security signals on the data communications bus.

18. A vehicle alerting system according to claim 17 further comprising an indicator connected to said relating to security of the vehicle.

19. A vehicle alerting system according to claim 18 wherein said indicator comprises one of an audible, visual, and tactile indicator.

20. A vehicle alerting system according to claim 17 wherein the at least one security sensor comprises at least one of a door switch, trunk switch, hood switch, motion sensor, and proximity sensor.

21. A vehicle alerting system according to claim 17 further comprising at least one additional communications link for relaying signals from said local transmitter to said remote receiver.

22. A vehicle alerting system according to claim 17 wherein said paging controller comprises desired signal enabling means for causing said local transmitter to transmit to said remote receiver based upon predetermined security signals for a corresponding desired vehicle from a plurality of sets of security originals for different vehicles.

23. A vehicle alerting system according to claim 17 wherein the at least one non-security device comprises a non-security controller.

24. A vehicle alerting system according to claim 23 wherein the non-security controller comprises an engine controller.

25. A vehicle alerting system according to claim 17 wherein the at least one non-security device comprises a vehicle actuator.

26. A vehicle alerting system for a vehicle comprising a data communications bus extending within the vehicle and at least one non-security device communicating over the data communications bus, the vehicle alerting system comprising:
- a remote transmitter;
- a local receiver to be positioned at the vehicle for receiving signals from said remote transmitter;
- a security controller to be connected to said local receiver and for generating security signals on the data communications bus extending within the vehicle;
- a remote receiver;
- a local transmitter to be positioned at the vehicle; and
- a paging controller to be connected to the data communications bus extending within the vehicle for causing said local transmitter to transmit to said remote receiver based upon security signals on the data communications bus.

27. A vehicle alerting system according to claim 26 further comprising an indicator connected to said paging receiver for providing an indication to the user relating to security of the vehicle.

28. A vehicle alerting system according to claim 27 wherein said indicator comprises one of an audible, visual, and tactile indicator.

29. A vehicle alerting system according to claim 26 further comprising at least one of a door switch, trunk switch, hood switch, motion sensor, and proximity sensor connected to said security controller.

30. A vehicle alerting system according to claim 26 further comprising at least one additional communications link for relaying signals from said local transmitter to said remote receiver.

31. A vehicle alerting system according to claim 26 wherein said paging controller comprises desired signal enabling means for causing said local transmitter to transmit to said remote receiver based upon predetermined security signals for a corresponding desired vehicle from a plurality of sets of security signals for different vehicles.

32. A vehicle alerting system according to claim 26 wherein the at least one non-security device comprises a non-security controller.

33. A vehicle alerting system according to claim 32 wherein the non-security controller comprises an engine controller.

34. A vehicle alerting system according to claim 26 wherein the at least one non-security device comprises a vehicle actuator.

35. A method for alerting a user when away from a vehicle comprising a data communications bus, at least one security device for generating security signals on the data communications bus, and at least one non-security device also communicating over the data communications bus, the method comprising:

providing a remote receiver to be carried by the user; and
connecting a paging unit to the data communications bus extending within the vehicle and comprising a local transmitter and a paging controller connected thereto for causing the local transmitter to transmit to the remote receiver based upon the security signals on the data communications bus.

36. A method according to claim 35 further comprising providing an indication to the user relating to security of the vehicle.

37. A method according to claim 35 wherein the at least one security device comprises at least one of a door switch, trunk switch, hood switch, motion sensor, and proximity sensor.

38. A method according to claim 35 wherein the at least one security device comprises a security controller.

39. A method according to claim 35 further comprising relaying signals from the local transmitter to the remote receiver via at least one additional communications link.

40. A method according to claim 35 further comprising enabling the paging controller to cause the local transmitter to transmit to the remote receiver based upon predetermined signals for a corresponding desired vehicle from a plurality of sets of signals for different vehicles.

41. A method according to claim 35 wherein the at least one non-security device comprises a non-security controller.

42. A method according to claim 41 wherein the non-security controller comprises an engine controller.

43. A method according to claim 35 wherein the at least one non-security device comprises a vehicle actuator.

* * * * *

UNITED STATES PATENT AND TRADEMARK OFFICE
CERTIFICATE OF CORRECTION

PATENT NO. : 6,771,167 B1
DATED : August 3, 2004
INVENTOR(S) : Kenneth E. Flick

It is certified that error appears in the above-identified patent and that said Letters Patent is hereby corrected as shown below:

Column 2,
Line 9, delete "seduce" insert -- reduce --
Line 16, delete "the a" insert -- the --

Column 7,
Line 37, delete "could" insert -- would --

Column 8,
Line 13, delete "leans" insert -- means --
Line 67, delete "bum" insert -- bus --

Column 9,
Line 18, delete "2" insert -- 1 --
Lines 23-24, delete "controllers" insert -- controller --

Column 10,
Line 22, delete "said relating" insert -- said paging receiver for providing an indication to the user relating --
Line 40, delete "originals" insert -- signals --

Signed and Sealed this

Fourteenth Day of December, 2004

JON W. DUDAS
*Director of the United States Patent and Trademark Office*